July 28, 1936.  J. BARBECK  2,049,149

SWITCH

Filed Aug. 31, 1934  2 Sheets-Sheet 1

Inventor
Joseph Barbeck
By Fisher, Moser & Moser
Attorney

July 28, 1936.   J. BARBECK   2,049,149
SWITCH
Filed Aug. 31, 1934   2 Sheets-Sheet 2

Inventor
Joseph Barbeck
By Fisher, Moss & Moore
Attorney

Patented July 28, 1936

2,049,149

UNITED STATES PATENT OFFICE 2,049,149

SWITCH

Joseph Barbeck, Cleveland, Ohio

Application August 31, 1934, Serial No. 742,336

4 Claims. (Cl. 200—59)

My present invention relates to electric signaling systems for indicating turning movements of an automobile and its object is a new and useful manually and automatically controllable switch member for such signaling systems. The switch member according to the invention is designed for advanced indication of the turning movement of the automobile and for such purpose may readily be set at any time to operate the signaling circuit and the signal lamps therein for indicating a future turning movement. The switch is also designed to automatically open the signaling circuit after straightening of the course of the automobile and to automatically actuate the signaling circuit whenever the automobile undergoes any turning movement, even when the operator fails to actuate the switch member in advance.

The novel features that I consider characteristic of my invention are set forth with particularity in the appended claims. The invention itself, however, both as to its organization and its method of operation, together with the advantages thereof, will best be understood from the following description of a specific embodiment when read in connection with the accompanying drawings in which:

Fig. 6 is a perspective view of the main cam, Fig. 7 is a perspective view of the contact effecting cam of the switch, and Fig. 8 is a perspective view of the return cam;

Figure 1:
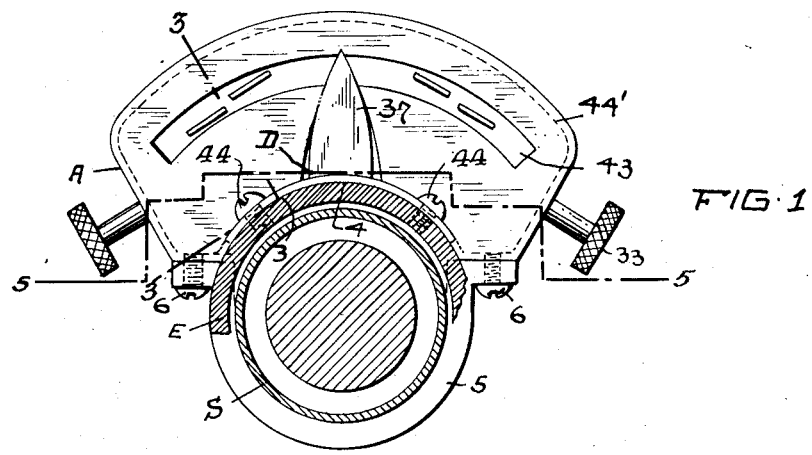
Fig. 1 is a cross sectional view through the hub of a steering wheel and its housing having the switch according to the invention attached thereto.
Figure 2:
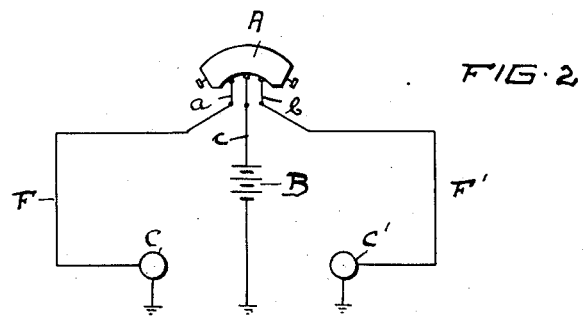
Fig. 2 is a wiring diagram of a signaling circuit controlled by the switch shown in Fig. 1.
Figure 3:
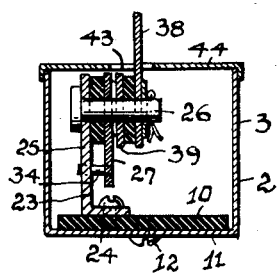
Fig. 3 is a cross sectional view on line 3—3 of Fig. 1.
Figure 4:
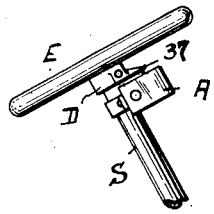
Fig. 4 is a side elevation of a steering wheel having the switch according to the invention attached thereto.
Figure 5:
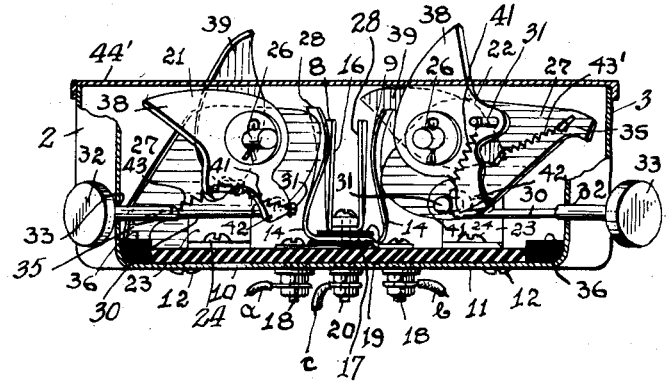
Fig. 5 is a longitudinal sectional view through the switch, the section being taken on line 5—5 of Fig. 1.
Figure 6:
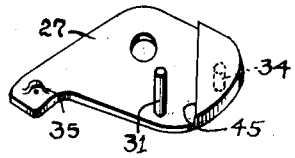
Figs. 6, 7 and 8 are perspective views of the cam members used for operation of the switching means, thus
Figure 9:
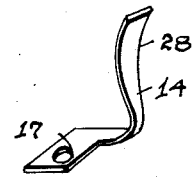
Fig. 9 is a perspective view of one of the contact members.
Figure 7:
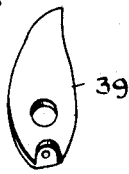
Figure 10:
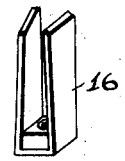
Fig. 10 is a perspective view of the central contact member.
Figure 8:
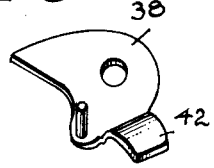

When installed switch member A is rigidly clamped to the steering column S of the steering mechanism of an automobile and electrically connected to the battery B of the lighting system as diagrammatically shown in Fig. 2, in which two signaling lamps C—C' are also shown in the circuits F—F' controlled by switch A. This switch co-operates with a bracket member D clamped to the hub of the steering wheel E and this bracket is rotated together with the steering wheel E, whereas the switch A is held rigidly by the steering column S.

The switch A embodies a metal switchbox or housing 2 of segmental shape, the inner side wall 3 of which is recessed as at 4 to permit of the box being securely clamped to the steering column S by means of a clamp 5, partly encircling said column and secured to the side wall 3 of box 2 by screws 6. This box 2 mounts a switch mechanism embodying two co-operating switching or contact making devices 8 and 9, which devices are electrically connected with the signalling circuits F—F' by means of wires $a$, $b$ and $c$, see Fig. 2. The contact making devices 8 and 9, which are mounted upon an insulating base member 10, secured to the bottom 11 of the box 2 by means of screws 12, each consist of a left and a right handed L-shaped yielding contact member 14 and a substantially U-shaped yielding contact member 16, arranged between the members 14 for co-operation with each of the latter members and control of the circuits F, F' respectively. The members 14 have their base portions 17 secured to the insulating base 10 by means of contact posts 18, which posts extend through the bottom 11 of box 2 and permit of the necessary electrical connections being made with the circuits F, F' by wires $a$ and $b$ respectively. As shown, the portions 17 of the two members 14 overlap each other and are electrically insulated from each other by insulating material 19, but it is obvious that the portions 17 can be mounted in any other suitable manner. The U-shaped yielding contact member 16 is secured to base member 10 by means of a contact post 20, which also extends through the bottom of the box 2 and permits of member 16 being electrically connected with the circuits F, F' by means of the wire $c$.

The contact making devices 8 and 9 are normally held open due to the yielding action of members 14 and 16 and can be closed either manually or automatically by two symmetrically arranged switch operating members 21, 22, which members are identical in construction with the exception that one member is right handed and the other one left handed. Each of these members embodies a bracket member 23 which is secured to the base 10 by screws 24. This bracket includes an upwardly extended arm 25, which supports a stud pin 26 secured to the upper perforated end of the arm 25. The pin 26 pivotally supports a cam member 27, which when rotatably shifted to a predetermined position forces the yielding portions 28 of contact members 14 into contact with the contact member 16. This is effected by a push rod 30, pivotally engaged with a stud shaft 31 on the cam member 27. The rod 30 is guided in and extended through a perforation 32 in the wall of box 2 and a knob 33 at the end of the rod facilitates manual control thereof. The rotatable movement of the cam member 27 is limited in one direction by a pin 34 on said member, which pin co-operates with the arm 25 of bracket 23, and in the other direction by an extension 35 on said cam member which extension co-operates with a raised portion 36 on base 10.

The automatic actuation of the switch operating members 21, 22 is effected by the pointed finger 37 of the bracket member D, secured to the hub of the steering wheel E by screws 44. This finger 37, when riding over the rigidly mounted switch box 2, engages one or the other of two cams 38, 39 of each switch operating member, which cams are pivotally mounted upon the pin 26. The cam 38, which is the contact cam, engages with a shoulder 45 on member 27 to permit of coupling of cam 38 with the said cam member 27, for rotation in one direction, and is yieldingly forced into contact with said shoulder by a spring 41 secured at opposite ends to cam member 27 and cam 38. The cam 39, which is the return cam, engages with its offset arm 42 the stud shaft 31 on cam member 27 to effect rotation of the cam member in an opposite direction, and this cam 39 is yieldingly forced into contact with the shaft 31 by a spring 43', secured to the stud shaft 31 on member 27 and the cam 39.

When the bracket 23 and its finger are rotated from neutral position toward left or right, the contact cam 38 and therewith cam 27 are shifted to close the contact making devices 8 and 9 respectively, and when bracket 23 and its finger 37 moves toward neutral position the return cam 39 and therewith the cam 27 are shifted in an opposite direction, whereupon the contact making devices 8 and 9 will be opened automatically.

The cams 38, 39 and cam member 27 are so related to each other that cam 38 extends upwardly and outwardly through a slot 43 in cover 44' of the box 2 when the cam members 27 hold the contact making devices 8 and 9 respectively in closed position, and the cam 39 extends upwardly and outwardly through the slot of said box when the cam members 27 are in neutral or inoperative position.

When the switch operating members 21 or 22 are in neutral position, that is, when the contact making devices 8 and 9 are open, the cam 38 extends upwardly and outwardly through the slotted top of box 2. Consequently a rotation of the steering wheel in clockwise or anti-clockwise direction causes the finger 37 of bracket D to engage and rotate the respective cam 38, which in turn effects rotation of cam member 27 by means of extension 42, engaging the stud shaft 31 on the cam member 27. During such rotation the cam 38 travels from an upward position to a downward position and the cam 39 travels from a downward to an upward position and therefore extends finally outwardly of box 2 into the course of the finger 37. Consequently, when the steering wheel is straightened the cam 39 is actuated. This cam engages the shoulder 45 on the cam 27 and therefore effects rotation of said cam 27 back to neutral position in which the circuits F, F' are interrupted at the respective contact device 8 and 9.

When the driver signals a left turn, the button 33 on the left side of box 2 is pushed inwardly for rotation of cam 27 to its operative position in which the contact making device 8 closes the circuit F. In this position the cam 39 is extended upwardly and outwardly through the slotted top 44 of the switch box 2. When the driver now turns the steering wheel to make the left turn, the finger 37 of bracket D slides over the cam 39, which yields downwardly against the tension of the spring 41 without rotating and then springs back to its original position. However, when the steering wheel is straightened out the cam 39 is forced by the finger 37 in an opposite direction and now engages the shoulder 45 on cam 27, which cam is rotated to its neutral position in which the circuit F is interrupted at contact device 8.

For a right hand turn the button 33 on the right side of the box 2 is actuated. The operation of the device is of course identical to that described above with the exception that the switch operating member 22 is actuated and the contact device 9 is closed and opened.

What I claim is:

1. An electric switch for automatically actuating the signaling circuit of an automobile by the turning movements of the steering wheel thereof comprising a housing, two yielding contact means within said housing, a pair of actuating means for each of said contact means arranged symmetrically at opposite sides of said yielding contact means, and means associated with said steering wheel for operating said actuating means, said actuating means each embodying a shaft a main cam pivoted on said shaft and engaging said contact means, and two auxiliary cams pivoted on said shaft and coupled for rotation with said main cam in one direction only and permitted to yieldingly rotate with respect to said main cam in the opposite direction, said auxiliary cams being yieldably rotatable in opposite directions and extending outwardly of said housing, when in predetermined positions for co-operation with said means associated with said steering wheel.

2. An electric switch for automatically actuating the signaling circuit of an automobile by the turning movements of the steering wheel thereof as described in claim 4, embodying shifting means for each of said main cams said shifting means extending outwardly through said housing for individual actuation of said main cams.

3. An electric switch as described in claim 1, wherein said auxiliary cams are angularly arranged with respect to each other to effect extension of only one of each of said auxiliary cams at the same time outwardly through the top of said housing.

4. In an electric switch for automatically and manually actuating the signaling circuit of an automobile two co-operating contacts, two shafts symmetrically arranged at opposite sides of said contacts, a main cam on each of said shafts pivotally supported thereon, for limited rotary movement, and two auxiliary cams on each of said shafts yieldingly forced into contact with the respective main cam and pivotally mounted for joint rotation with said main cam in one direction and individual rotation in the opposite direction, said auxiliary cams rotating yieldingly in opposite directions.

JOSEPH BARBECK.